US011541474B2

(12) United States Patent
Pfaller et al.

(10) Patent No.: US 11,541,474 B2
(45) Date of Patent: Jan. 3, 2023

(54) WIRE SHAPING DEVICE FOR BULK PACKAGED WELDING WIRE

(71) Applicant: Alcotec Wire Corporation, Traverse City, MI (US)

(72) Inventors: Thomas Leo Pfaller, Traverse City, MI (US); Robert Allen Krause, Interlochen, MI (US)

(73) Assignee: ALCOTEC WIRE CORPORATION, Traverse City, MI (US)

( * ) Notice: Subject to any disclaimer, the term of this patent is extended or adjusted under 35 U.S.C. 154(b) by 920 days.

(21) Appl. No.: 16/379,989

(22) Filed: Apr. 10, 2019

(65) Prior Publication Data
US 2019/0232416 A1    Aug. 1, 2019

Related U.S. Application Data

(63) Continuation of application No. PCT/US2016/067099, filed on Dec. 16, 2016.

(51) Int. Cl.
*B23K 9/133* (2006.01)
*B21F 1/02* (2006.01)

(52) U.S. Cl.
CPC .............. *B23K 9/1336* (2013.01); *B21F 1/02* (2013.01); *B23K 9/1333* (2013.01)

(58) Field of Classification Search
CPC .. B21F 1/02; B23K 9/12; B23K 9/133; B23K 9/1333; B23K 9/1336

(Continued)

(56) References Cited

U.S. PATENT DOCUMENTS

| 2,188,358 A | 1/1940 | Kilmer |
| 3,052,179 A | 9/1962 | Sirles et al. |

(Continued)

FOREIGN PATENT DOCUMENTS

| CN | 102601494 A | 7/2012 |
| CN | 102974717 A | 3/2013 |

(Continued)

OTHER PUBLICATIONS

Extended European Search Report from the European Patent Office for Application No. 16923657.7 dated Jul. 14, 2020, 8 pages.

(Continued)

*Primary Examiner* — Dana Ross
*Assistant Examiner* — James F Sims, III
(74) *Attorney, Agent, or Firm* — Edell, Shapiro & Finnan, LLC

(57) ABSTRACT

A wire shaping device for shaping a welding wire stored in a bulked storage container shapes the welding wire by flexing of the welding wire as it is drawn around sheaves. The wire shaping device can be located immediately adjacent to a wire feeding device of the welder. In use, the wire shaping device may include an inlet port for receiving the wire, a first rotatable sheave for receiving the wire from the inlet port, the first rotatable sheave being rotatable in a first direction; a second rotatable sheave for receiving the wire from the first rotatable sheave, the second rotatable sheave being rotatable in a second direction opposite of the first direction; and an outlet port for receiving the wire from the second rotatable sheave. The wire shaping device may also include a mounting plate and first and second rollers operatively associated with the first and second sheaves, respectively.

13 Claims, 3 Drawing Sheets

(58) Field of Classification Search
USPC .................................................... 219/137.8
See application file for complete search history.

(56) References Cited

U.S. PATENT DOCUMENTS

| | | |
|---|---|---|
| 4,160,151 A | 7/1979 | Tonita |
| 4,949,567 A | 8/1990 | Corbin |
| 8,813,531 B2 * | 8/2014 | Burns ..................... B21F 1/02 |
| | | 140/147 |
| 2012/0186689 A1 | 7/2012 | Burns et al. |

FOREIGN PATENT DOCUMENTS

| | | |
|---|---|---|
| JP | S59150637 A | 8/1984 |
| JP | 3232607 B2 | 6/1993 |
| JP | H05138351 A | 6/1993 |

OTHER PUBLICATIONS

Notification of Transmittal of International Search Report and Written Opinion including International Search Report and Written Opinion for International Application No. PCT/US2016/067099 dated Feb. 24, 2017, 9 pages.
Office Action for Canadian Patent Application No. 3,406,190 dated May 20, 2020, 3 pages.
Examination Report No. 1 for Australian Patent Application No. 2016432683 dated Apr. 15, 2020, 3 pages.
Office Action for Brazilian Patent Application No. BR112019011372-0 with machine translation dated Mar. 23, 2020, 5 pages.
Office Action for Chinese Patent Application No. 201680091593.4 dated Mar. 11, 2020, 11 pages.

* cited by examiner

WIRE SHAPING DEVICE FOR BULK PACKAGED WELDING WIRE

CROSS REFERENCE TO RELATED APPLICATIONS

This application claims priority to and is a continuation of International Application PCT/US2016/067099, filed Dec. 16, 2016, entitled "Wire Shaping Device for Bulk Packaged Welding Wire," the entire disclosure of which is incorporated herein by reference.

FIELD OF THE DISCLOSURE

The present disclosure relates generally to a wire shaping device for use in a welding process and, more particularly, to a device for shaping the welding wire.

BACKGROUND OF THE DISCLOSURE

Wire, for example, welding wire is often packaged in storage containers, for example, coiled inside of a drum (e.g., bulk barrels) or wrapped around a spool. As a result, the wire is commercially packed, shipped and stored in a coiled configuration, most of the time in a storage container. This results in the wire having a deviation from straightness. That is, when removed from the drum for use, the welding wire often has a sine-wave shape and if the wire is not manipulated correctly, this sine-wave shape can lead to an undesirable change in direction of the welding wire as it exits the contact tip of the welding gun. In addition, welding wire often has an inherent twist that may also cause a similar undesired change in direction.

In welding applications, controlling the shape of the welding wire is generally very important. In use, the welding wire is drawn from a drum and fed to a welding gun. The wire enters the gun through the rear and exits through a tip where it melts to form a weld bead between a pair of workpieces. During this process the wire, if not controlled, tends to re-coil, that is, the wire attempts to resume its original shape, or deviates from linearity and can cause disruptions in the equipment, which can cause a disruption of the welding process and a possible shutdown of the equipment for repair and/or rework of the weld joint. As such, attempts have been made to straighten the welding wire in order to facilitate its passage through the welding tip without complication.

Known prior art wire shaping devices have been unable to provide the necessary robust and reliable results needed to meet the needs of the welding process. In addition, known prior art wire shaping devices often require the device to be mounted at the location of the bulk container, thus resulting in increased feeding issues and greater component wear as the wire shaping device must increase the required pull force to remove the welding wire from the bulk container. Furthermore, some prior art wire shaping devices required the use of a feed motor to assist in removing the wire from the bulk container, thus increasing the initial cost of the device as well as the on-going operation costs.

As a result, it would be beneficial to provide a wire shaping device that overcomes these problems.

SUMMARY OF THE DISCLOSURE

The present disclosure is directed to a wire shaping device for shaping welding wire from a wire storage container to a welding gun. In one embodiment, the wire shaping device may include an inlet port, first and second rotatable sheaves, first and second rotatable rollers, and an outlet port. In use, the inlet port may receive the wire. The first rotatable sheave may receive the wire from the inlet port. The first rotatable sheave may be rotatable in a first direction. The first rotatable roller may be operatively associated with the first rotatable sheave so that as the wire rotates along an outer circumferential surface of the first rotatable sheave, the wire passes between the outer circumferential surface of the first rotatable sheave and the first roller. The second rotatable sheave may receive the wire from the first rotatable sheave. The second rotatable sheave may be rotatable in a second direction wherein the second direction may be opposite of the first direction. The second rotatable roller may be operatively associated with the second rotatable sheave so that as the wire rotates along an outer circumferential surface of the second rotatable sheave, the wire passes between the outer circumferential surface of the second rotatable sheave and the second roller. The outlet port may receive the wire from the second rotatable sheave.

The first and second sheaves may be positioned so that the outer circumferential surface of the first sheave may be substantially level with the inlet port and the outer circumferential surface of the second sheave may be substantially level with the output port. The wire may travel along the outer circumferential surface of the first and second sheaves for approximately 180 degrees.

The wire shaping device may further include a mounting plate for securing the inlet port, the outlet port, the first and second sheaves and the first and second rollers in a predetermined position with respect to each other. The mounting plate may also include an opening formed therein so that the mounting plate can be secured adjacent to a welding wire feeder. The mounting plate may also include one or more support brackets so that the mounting plate can be secured directly to the wire feeder structure.

The inlet port and the outlet port may each include a wire guide sleeve having an opening for receiving and passing the wire therethrough. The inlet and outlet wire guides may each be coupled to a flexible conduit for guiding the wire to and from the wire shaping device. The flexible conduit may be made from a plastic or elastomeric material.

The first and second sheaves may include a groove formed in the outer circumferential surface for guiding the wire.

The present disclosure is also directed to a method of moving a wire from a wire storage container to a welding device. The method may include drawing a wire from a storage container, moving the wire through an inlet port, moving the wire around an outer circumferential surface of a first rotatable sheave rotating in a first direction, moving the wire around an outer circumferential surface of a second rotatable sheave rotating in a second direction where the second direction may be opposite of the first direction, and moving the wire through an outlet port to a welding device.

Moving the wire around the outer circumferential surface of the first rotatable sheave may cause the wire to move between the outer circumferential surface of first rotatable sheave and an outer circumferential surface of a first rotatable roller. Moving the wire around the outer circumferential surface of the second rotatable sheave may cause the wire to move between the outer circumferential surface of second rotatable sheave and an outer circumferential surface of a second rotatable roller. The wire may move along a substantially level path as it moves from the inlet port to the outer circumferential surface of the first rotatable sheave. The wire may move along a substantially level path as it moves from the outer circumferential surface of the second rotatable sheave to the outlet port. Moving the wire around the outer circumferential surface of the first rotatable sheave may cause the wire to contact the outer circumferential surface for approximately 180 degrees. Moving the wire around the outer circumferential surface of the second rotatable sheave may cause the wire to contact the outer circumferential surface for approximately 180 degrees.

The wire shaping device may be secured adjacent to the welding device.

BRIEF DESCRIPTION OF THE DRAWINGS

By way of example, specific embodiments of the disclosed device will now be described, with reference to the accompanying drawings, in which.

DETAILED DESCRIPTION

Figure 1:
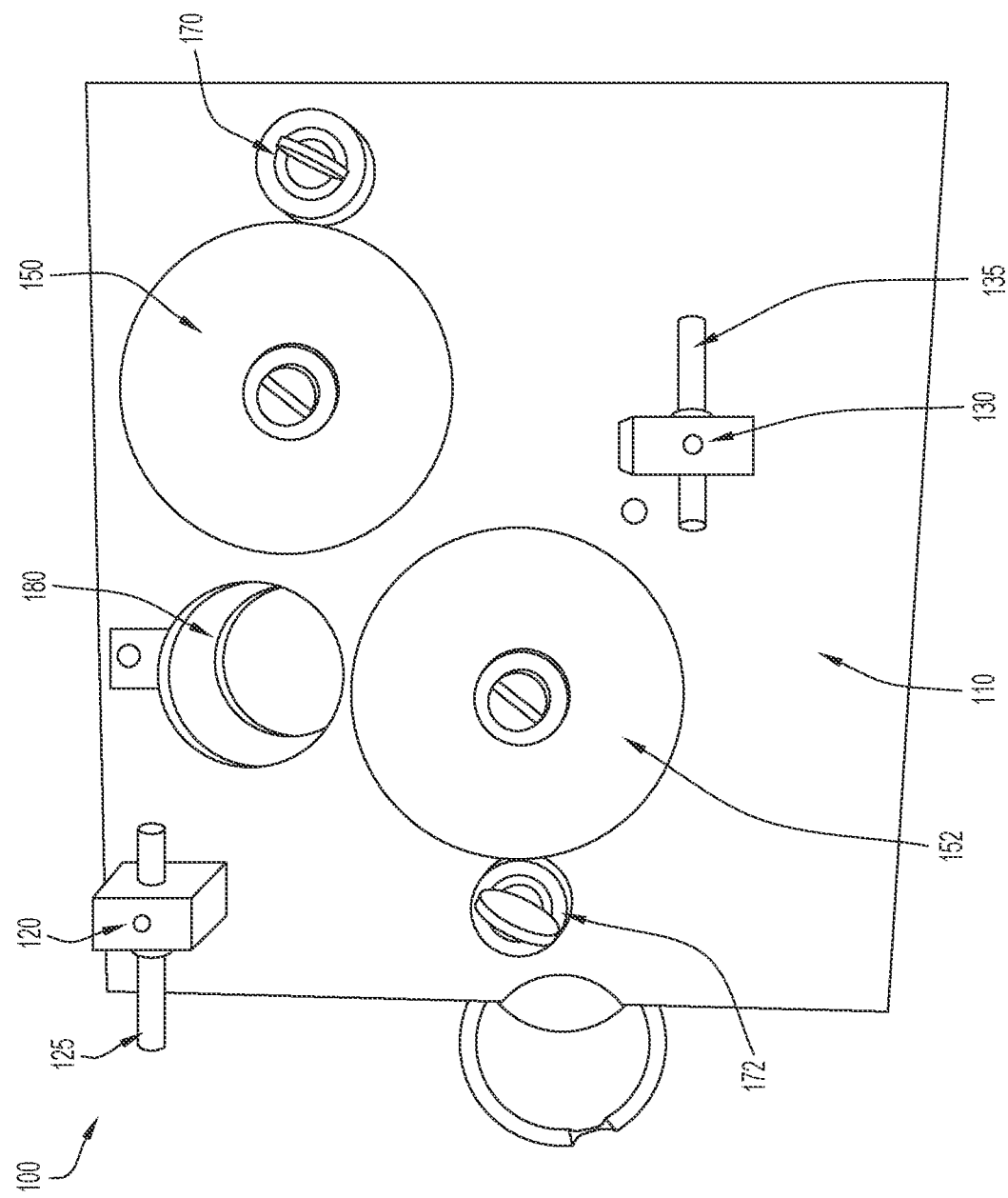
FIG. 1 is a front view of an exemplary embodiment of a wire shaping device in accordance with the present disclosure.

A device, system and method in accordance with the present disclosure will now be described more fully hereinafter with reference to the accompanying drawings, in which preferred embodiments of the device, system and method are shown. The disclosed device, system and method, however, may be embodied in many different forms and should not be construed as being limited to the embodiments set forth herein. Rather, these embodiments are provided so that this disclosure will be thorough and complete, and will fully convey the scope of the devices, system and method to those skilled in the art. In the drawings, like numbers refer to like elements throughout.

Figure 2:
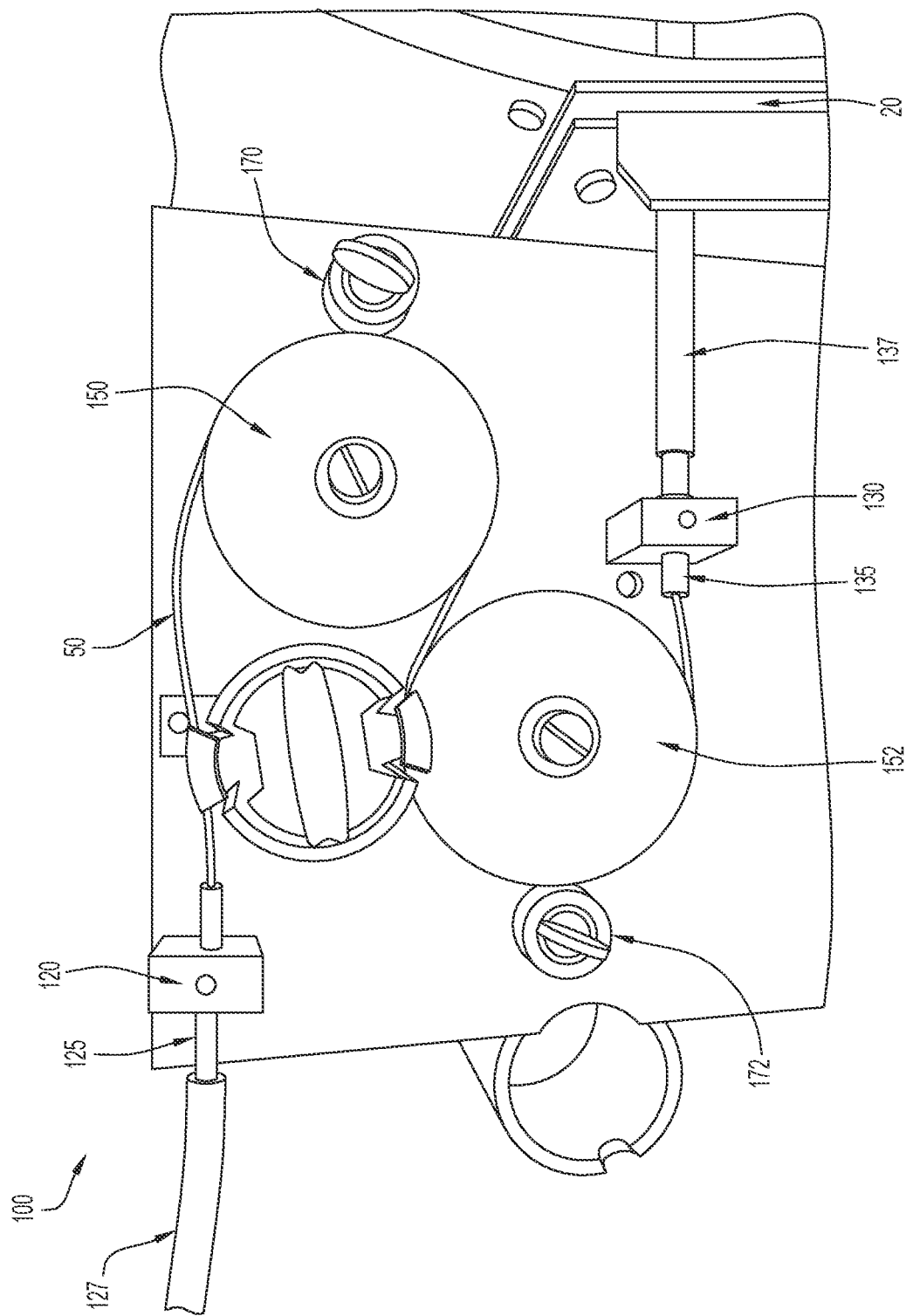
FIG. 2 is a front view of the wire shaping device of FIG. 1, the wire shaping device including the wire loaded therein.

Referring to FIGS. 1 and 2, the present disclosure relates to a wire shaping device 100 that modifies the shape of a welding wire 50 from the sine wave of the stored, coiled wire. The wire shaping device 100 modifies the shape, for example, the sine-wave shape of the welding wire 50 by flexing of the welding wire 50 as it is drawn around a plurality of sheaves 150, 152. In addition, the wire shaping device 100 of the present disclosure is adapted and configured so that it can be located immediately adjacent to, or prior to, a wire feeding device of the welder. Thus, the wire shaping device 100 according to the present disclosure is able to deliver the welding wire 50 directly to the wire feeding device of the welding equipment. This, in turn, produces a welding wire 50 with a consistent and desirable shape.

Although the present disclosure will be described in connection with a welding wire for use in a welding process, it is contemplated that the present disclosure has applicability in other industries where a long, thin wire needs to be shaped. In addition, although the welding wire is envisioned as being manufactured from aluminum, it is contemplated that the welding wire may be manufactured from other materials, including, but not limited to steel, stainless steel, flux cored, metal cored, copper, etc.

FIGS. 1 and 2 illustrate a wire shaping device 100 in accordance with the present disclosure. The wire shaping device 100 may include a mounting plate 110, an inlet port 120 for receiving the wire 50, an outlet port 130 for enabling the wire 50 to exit, one or more sheaves 150, 152 and one or more associated rollers 170, 172. The wire shaping device 100 may also incorporate an opening 180 formed in the mounting plate 110 for facilitating mounting the wire shaping device 100 adjacent to the welder feeder 20.

The inlet port 120 and the outlet port 130 may include a wire guide sleeve 125, 135, respectively. The wire guide sleeves 125, 135 may be made from any suitable material, for example, the wire guide sleeves may be made from a plastic material such as, Nylatron GS. In this manner, the inlet port 120 and the outlet port 130 may clamp down onto the wire guide sleeves 125, 135 without any risk to damaging the wires. As shown, the wire guide sleeves 125, 135 may be secured to the inlet port 120 and the outlet port 130, respectively, via set screws, although other means for securing the wire guide sleeves 125, 135 to the inlet and outlet ports, 120, 130 are contemplated. In use, the welding wire 50 may be fed to and away from the wire shaping device 100 by a hollow conduit 127, 137, respectively. The hollow conduits 127, 137 made be made of any suitable material. For example, the hollow conduits 127, 137 made be made from a plastic or elastomeric material. In use, the hollow conduit 127 coupled to the inlet wire guide 125 guides and protects the wire 50 from the wire storage container to the wire shaping device 100, while the hollow conduit 137 coupled to the outlet wire guide 135 guides and protects the wire 50 from the wire shaping device 100 to the wire feeder 20.

The hollow conduits 127, 137 may be sized and configured to couple to the inlet wire guide sleeve 125 and the outlet wire guide sleeve 137 so that the welding wire 50 may be fed from the inlet hollow conduit 127 to the inlet wire guide sleeve 125 through the wire shaping device 100 and exit the outlet wire guide sleeve 135 to the outlet hollow conduit 137. While the present disclosure has been described in connection with inlet conduit, inlet wire guide sleeve, outlet wire guide sleeve and outlet conduit, it should be understood that such arrangement is entirely optional and that any other arrangement may be incorporated.

The mounting plate 110 may be configured to mount the wire shaping device 100 in a predetermined manner, namely, such that the components of the wire shaping device 100 are properly aligned in the direction of travel through the device 100. The mounting plate 110 is also used to stabilize the various components. The mounting plate 110 may have any suitable shape, for example, as shown the mounting plate 110 may have a generally square shape although other shapes are contemplated including rectangular, trapezoidal, etc.

As previously mentioned, the mounting plate 110 may also include a hole 180 formed therein for receiving a wire feeder spindle to mount the wire shaping device 100 to the wire feeder structure so that the wire shaping device 100 can be mounted adjacent to the welder feeder 20. The mounting plate 100 may be attached in any number of different ways. Attachment of the mounting plate 100 will be largely dependent on the arrangement of the welding equipment. For example, the mounting plate 100 may be placed on a spool spindle using the hole 180 formed in the mounting plate 100. Alternatively, one or more brackets (not shown) can be used to attach (for example, clamp or bolt) the mounting plate 100 to the welding equipment. It will, however, be appreciated that the mounting plate 110 can be mounted via any other mechanism now known or hereafter developed.

As shown, the wire shaping device 100 may include first and second sheaves 150, 152 and first and second rollers 170, 172. The first roller 170 is operatively associated with the first sheave 150, while the second roller 172 is operatively associated with the second sheave 152. The first and second rollers 170, 172 ensure that the welding wire 50 is properly positioned on the first and second sheaves 150, 152, thus preventing the welding wire 50 from becoming dislodged from the first and second sheaves 150, 152 during operation. As used herein, a sheave may be a wheel or roller with a groove in its circumferential surface for guiding the welding wire. As shown, the first and second rollers 170, 172 may include an adjustment knob 171, 173, respectively. Alternatively, the first and second rollers 170, 172 may include a screw head thereon for tightening the first and second rollers 170, 172 to the mounting plate 100.

Figure 3:
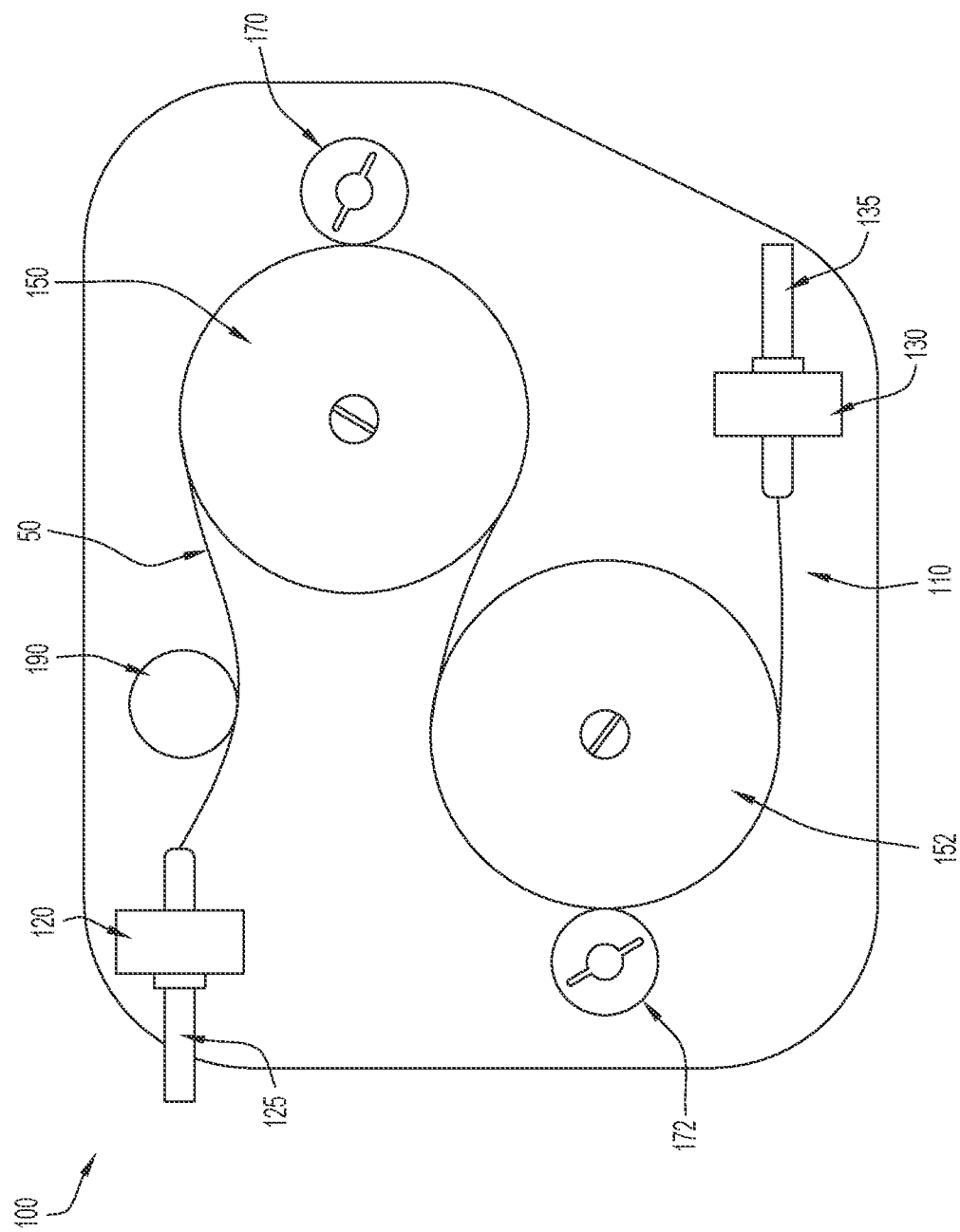
FIG. 3 is a front view of an alternate embodiment of a wire shaping device in accordance with the present disclosure, the wire shaping device including a tensioner.

In addition, the wire shaping device 100 may include a mechanism for ensuring the wire 50 remains in contact with the first and second sheaves 150, 152. For example, the wire shaping device 100 may include a tensioner or a tensioner pulley-type system 190. For example, referring to FIG. 3, the tensioner 190 may be located between the inlet port 120 and the first sheave 150.

The first sheave 150 may be located on the mounting plate 110 such that the top of the first sheave 150 is substantially parallel with the inlet port 120. That is, the input wire guide 125 and the first sheave 150 are adapted and configured such that the input wire guide 125, and hence the wire 50, may be essentially level with the top of the circumferential surface of the first sheave 150. By this it is meant that the wire 50 at this point is maintained such that it is substantially straight and does not have a significant hooped portion. In this manner, upon exiting the inlet port 120, the welding wire 50 travels along a path that is substantially straight before it contacts the top circumferential surface of the first sheave 150. In use, as shown, the first sheave 150 rotates in a clockwise direction CW. During rotation, the welding wire 50 travels along the outer circumferential surface of the first sheave 150 for approximately 180 degrees. As the welding wire 50 rotates along the outer diameter of the first sheave 150, the welding wire 50 passes between the first roller 170 and the first sheave 150.

Upon exiting the first sheave 150, the welding wire 50 travels to and along an outer circumferential diameter of the second sheave 152. The second sheave 152 may be located on the mounting plate 110 such that the bottom of the second sheave 152 is substantially parallel with the outlet port 130. That is, the output wire guide 135 and the second sheave 152 are adapted and configured such that the output wire guide 135, and hence the wire 50, may be essentially level with the bottom of the circumferential surface of the second sheave 152. In addition, as shown, upon exiting the second sheave 152, the wire 50 passes almost immediately into the output wire guide sleeve 135. In this manner, upon exiting the second sheave 152, the welding wire 50 travels along a path that is substantially straight before it enters the output wire guide 135 and exits the wire shaping device 100 at the outlet port 130. In addition, the second sheave 152 may be located adjacent to the first sheave 150 so that the welding wire 50 travels a relatively short distance between the first and second sheaves 150, 152. In use, as shown, the second sheave 152 rotates in a counter-clockwise direction CCW. During rotation, the welding wire 50 travels along the outer circumferential surface of the first sheave 150 for approximately 180 degrees. As the welding wire 50 rotates along the outer diameter of the second sheave 152, the welding wire 50 passes between the second roller 172 and the second sheave 152.

In this manner, the welding wire 50 is pulled into the wire shaping device 100 and travels around a plurality of sheaves 150, 152 in order to yield the wire in two different directions (e.g., back and forth). The yielding of the welding wire 50 shapes the welding wire 50, that is, it removes any twist and the sine wave shape common to bulk packaged wire. The second sheave 152, in use, provides the desired shape to ensure that the direction of travel of the welding wire 50 is consistent as it is fed through the welding system.

In one illustrative embodiment, the horizontal center-to-center distance between the plurality of sheaves 150, 152 may be approximately 3.2 inches, while the vertical center-to-center distance between the plurality of sheaves 150, 152 may be 2.5 inches. The center of the first roller 170 may be horizontally parallel to the centered of the first sheave 150. Similarly, the center of the second roller 172 may be horizontally centered with the center of the second sheave 170. The horizontal center-to-center distances between the first and second sheaves 150, 152 and the first and second rollers 170, 172, respectively, may be approximately 2.2 inches. These dimensions are only illustrative and non-limiting, one of ordinary skill in the art will recognize that these dimensions can vary.

While exemplary sizes have been provided, these sizes are indicative of a single exemplary embodiment, one skilled in the art will appreciate that other sizes may be used. For example, one skilled in the art will appreciate that by varying the diameters of the sheaves 150, 152, minor changes in the shape of the welding wire 50 can be achieved.

The sheaves 150, 152 and rollers 170, 172 may be made from any material suitable for such purpose. The sheaves 150, 152 may be made from a durable, but soft plastic or the like, that has ceramic, or the like, particles embedded therein. The sheaves 150, 152 should be configured so that they do not severely abrade the welding wire 50 as it is being pulled across the sheaves 150, 152. Therefore, it is generally prudent to provide the sheaves 150, 152 as plastic members with particles embedded therein to provide some modicum of friction so that through their rotational movement they may move the wire 50 along a desired path. For example, Ultra High Molecular Weight polyethylene embedded with ceramic particles has been found useful, as have phenolic and urethane resins. Metal sheaves can be used herein, but metal sheaves have shown to cause significant abrasion of the welding wire.

It is to be noted that the disclosed wire shaping device 100 causes a wire 50 to pass through a series of sheaves 150, 152 made from a plastic material (e.g., ultra-high molecular weight polyethylene), which in one non-limiting exemplary embodiment are reinforced with ceramic fiber. These sheaves 150, 152 tend to mechanically yield the wire 50 to force it to take the shape of the sheaves 150, 152.

By providing a compact wire shaping device 100 as described, the wire shaping device 100 can be located adjacent to the welder as opposed to the bulk storage container. As a result, the force required to pull the welding wire 50 through the wire shaping device 100 is greatly reduced as compared to prior devices, thus ensuring that the direction of travel of the welding wire 50 is consistent as it is fed through the welding system.

In use, a storage container containing coiled welding wire may be provided. A lead end of the stored wire may be introduced into the inlet wire guide sleeve 125. Thereafter, the wire 50 can be pulled over and around a circumferential surface of the first sheave 150, over and around a circumferential surface of the second sheave 152 to modify the shape of the wire 50, and then into the outlet wire guide sleeve 135 and into a plastic conduit, where the plastic conduit is of a length sufficient to carry the wire 50 therein to a welding gun.

The wire shaping device 100 according to the present disclosure results in a lower required force for pulling the welding wire 50 through the wire shaping device 100 as compared to known prior art devices. Thus, in use, it is envisioned that the welding equipment should be sufficient to pull the wire 50 through the wire shaping device 100. This provides a significant advantage over prior art devices. Alternatively, however, it is contemplated that an assisting motor may also be used. For example, a powered motor (i.e. pneumatic, electrical) could be mounted between the wire shaping device and the existing wire feeder. This would be done to reduce the amount of work required by the wire feeder to pull the wire through the device. Using an air driven system provides the additional advantages of eliminating the need for electrical interface/power to drive the unit and removes issues and regulations that attend the use of an electrical power supply. Using an air driven system can also allow the device usage in those areas of the world that do not have sufficient electrical energy sources to power such equipment.

Finally, the wire shaping device 100 according to the present disclosure results in a number of other benefits as compared to prior art devices. For example, the wire shaping device 100 provides a more consistent reshaping of the welding wire 50. In addition, the wire shaping device 100 enables one to mount the device 100 adjacent to welding equipment.

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features. In addition, for the sake of convenience and clarity, terms such as "front," "rear," "outer," "inner," "top," "bottom," "upper," "lower," "upwards," "downwards," "vertical," "horizontal," "lateral," "longitudinal," "height," and "width" may have been used herein to describe the relative placement and orientation of the device and its various components, each with respect to the geometry and orientation of the device as it appears in the figures. While certain embodiments of the disclosure have been described herein, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision other modifications within the scope and spirit of the claims appended hereto.

What is claimed is:

1. A wire shaping device for shaping a welding wire from a wire storage container to a welding gun, comprising:
    an inlet port for receiving the wire;
    a first rotatable sheave for receiving the wire from the inlet port, the first rotatable sheave being rotatable in a first direction;
    a first rotatable roller operatively associated with the first rotatable sheave so that as the welding wire rotates along an outer circumferential surface of the first rotatable sheave, the welding wire passes between the outer circumferential surface of the first rotatable sheave and the first roller;
    a second rotatable sheave for receiving the wire from the first rotatable sheave, the second rotatable sheave being rotatable in a second direction, the second direction being opposite of the first direction;
    a second rotatable roller operatively associated with the second rotatable sheave so that as the welding wire rotates along an outer circumferential surface of the second rotatable sheave, the welding wire passes between the outer circumferential surface of the second rotatable sheave and the second roller; and
    an outlet port for receiving the wire from the second rotatable sheave;
    wherein the welding wire travels along the outer circumferential surface of each of the first and second sheaves for 180 degrees or greater.

2. The wire shaping device of claim 1, wherein the outer circumferential surface of the first sheave is substantially level with the inlet port and wherein the outer circumferential surface of the second sheave is substantially level with the outlet port.

3. The wire shaping device of claim 1, further comprising a mounting plate, the mounting plate for securing the inlet port, the outlet port, the first and second sheaves and the first and second rollers in a predetermined position with respect to each other.

4. The wire shaping device of claim 3, wherein the mounting plate further comprises an opening formed therein so that the mounting plate can be secured adjacent to a welding wire feeder.

5. The wire shaping device of claim 1, wherein the inlet port and the outlet port each include a wire guide sleeve having an opening for receiving and passing the wire therethrough.

6. The wire shaping device of claim 5, wherein the inlet and outlet wire guides are each coupled to a flexible conduit for guiding the wire to and from the wire shaping device, the flexible conduit comprising a plastic or elastomeric material.

7. The wire shaping device of claim 1, wherein at least one of the first and second sheaves includes a groove formed in the outer circumferential surface for guiding the wire.

8. A method of moving a welding wire from a wire storage container to a welding device, comprising:
    drawing the welding wire from a storage container;
    moving the welding wire through an inlet port;
    moving the welding wire around an outer circumferential surface of a first rotatable sheave rotating in a first direction;
    moving the welding wire around an outer circumferential surface of a second rotatable sheave rotating in a second direction, the second direction being opposite of the first direction; and
    moving the welding wire through an outlet port to a welding device;
    the welding wire travels along the outer circumferential surface of each of the first and second sheaves for 180 degrees or greater.

9. The method of claim 8, wherein moving the welding wire around the outer circumferential surface of the first rotatable sheave further causes the welding wire to move between the outer circumferential surface of the first rotatable sheave and an outer circumferential surface of a first rotatable roller.

10. The method of claim 9, wherein moving the welding wire around the outer circumferential surface of the second rotatable sheave further causes the welding wire to move between the outer circumferential surface of the second rotatable sheave and an outer circumferential surface of a second rotatable roller.

11. The method of claim 8, wherein the welding wire moves along a substantially level path as it moves from the inlet port to the outer circumferential surface of the first rotatable sheave.

12. The method of claim 11, wherein the welding wire moves along a substantially level path as it moves from the outer circumferential surface of the second rotatable sheave to the outlet port.

13. The method of claim 8, wherein a wire shaping device executes the drawing and each of the wire moving steps, and the method further comprises securing the wire shaping device adjacent to the welding device.

\* \* \* \* \*